(12) United States Patent
Klein et al.

(10) Patent No.: US 8,066,468 B2
(45) Date of Patent: Nov. 29, 2011

(54) APPARATUS FOR COLLECTING AND CONVEYING STACKS OF SHEETS

(75) Inventors: Hansjoerg Klein, Aichwald (DE); Axel Meyer, Bad Urach (DE)

(73) Assignee: Bielomatik Leuze GmbH & Co. KG, Neuffen (DE)

( * ) Notice: Subject to any disclaimer, the term of this patent is extended or adjusted under 35 U.S.C. 154(b) by 353 days.

(21) Appl. No.: 12/306,089

(22) PCT Filed: Jan. 27, 2007

(86) PCT No.: PCT/EP2007/000719
§ 371 (c)(1),
(2), (4) Date: Mar. 16, 2009

(87) PCT Pub. No.: WO2007/147452
PCT Pub. Date: Dec. 27, 2007

(65) Prior Publication Data
US 2009/0180857 A1    Jul. 16, 2009

(30) Foreign Application Priority Data

Jun. 23, 2006 (DE) .......................... 10 2006 029 342

(51) Int. Cl.
*B65H 31/30* (2006.01)
*B30B 5/04* (2006.01)
(52) U.S. Cl. .................. 414/790.6; 414/790.2; 414/907; 198/468.2; 198/468.9; 100/151; 100/195
(58) Field of Classification Search .......... 100/151–152, 100/194–195, 90; 198/427, 468.2, 468.8–468.9; 414/622, 789.9, 790.2, 7, 90.6, 90.7, 793.4, 414/907; 53/436, 523; 99/443 C
See application file for complete search history.

(56) References Cited

U.S. PATENT DOCUMENTS

| | | | | |
|---|---|---|---|---|
| 3,370,549 A * | 2/1968 | Livingston | .................... | 104/212 |
| 3,567,046 A * | 3/1971 | Reist | .......................... | 414/791.1 |
| 4,688,372 A * | 8/1987 | Langen et al. | .................. | 53/529 |
| 4,765,791 A * | 8/1988 | Brandt et al. | .................. | 414/788 |
| 4,938,126 A * | 7/1990 | Rubio et al. | .................... | 99/349 |
| 4,984,516 A * | 1/1991 | Scalzitti et al. | ................. | 100/90 |
| 5,233,815 A * | 8/1993 | Kroger et al. | .................. | 53/540 |

(Continued)

FOREIGN PATENT DOCUMENTS

DE    102004056018    5/2006

(Continued)

*Primary Examiner* — Gregory Adams
(74) *Attorney, Agent, or Firm* — Andrew Wilford

(57) ABSTRACT

The invention relates to collecting and conveying devices for stacks of sheets (3), comprising a collecting station (1) in which a corresponding number of sheet stacks (3) are formed simultaneously from several imbricated flows (2) of sheets which are guided adjacent to each other, a transversal transporter (4) which is arranged at a distance behind the collecting station (1) for transporting the finished stack of sheets (3) in a manner transversal to the direction of transport of the sheets in the collecting station (1) and a transfer device (5) which is used to transport the stack of sheets (3) from the collecting station (1) to the transversal transporter (4). According to the invention, a carriage (9) that can be displaced over a given path in a manner that is synchronous with the transversal support (4) is arranged adjacent thereto. Also, a row of holding down clamps (10) is secured to said carriage and the holding down clamps can be lowered on the stack of sheets (3) located on the transversal transporter (4).

4 Claims, 10 Drawing Sheets

U.S. PATENT DOCUMENTS

| | | | |
|---|---|---|---|
| 5,687,644 A | 11/1997 | Rann et al. | 100/90 |
| 5,979,145 A * | 11/1999 | Louis et al. | 53/439 |
| 6,112,647 A * | 9/2000 | Brunner et al. | 99/349 |
| 6,454,518 B1 * | 9/2002 | Garcia-Balleza et al. | 414/801 |
| 6,942,087 B2 * | 9/2005 | Meyer | 198/427 |

FOREIGN PATENT DOCUMENTS

EP  1568639  8/2005

* cited by examiner

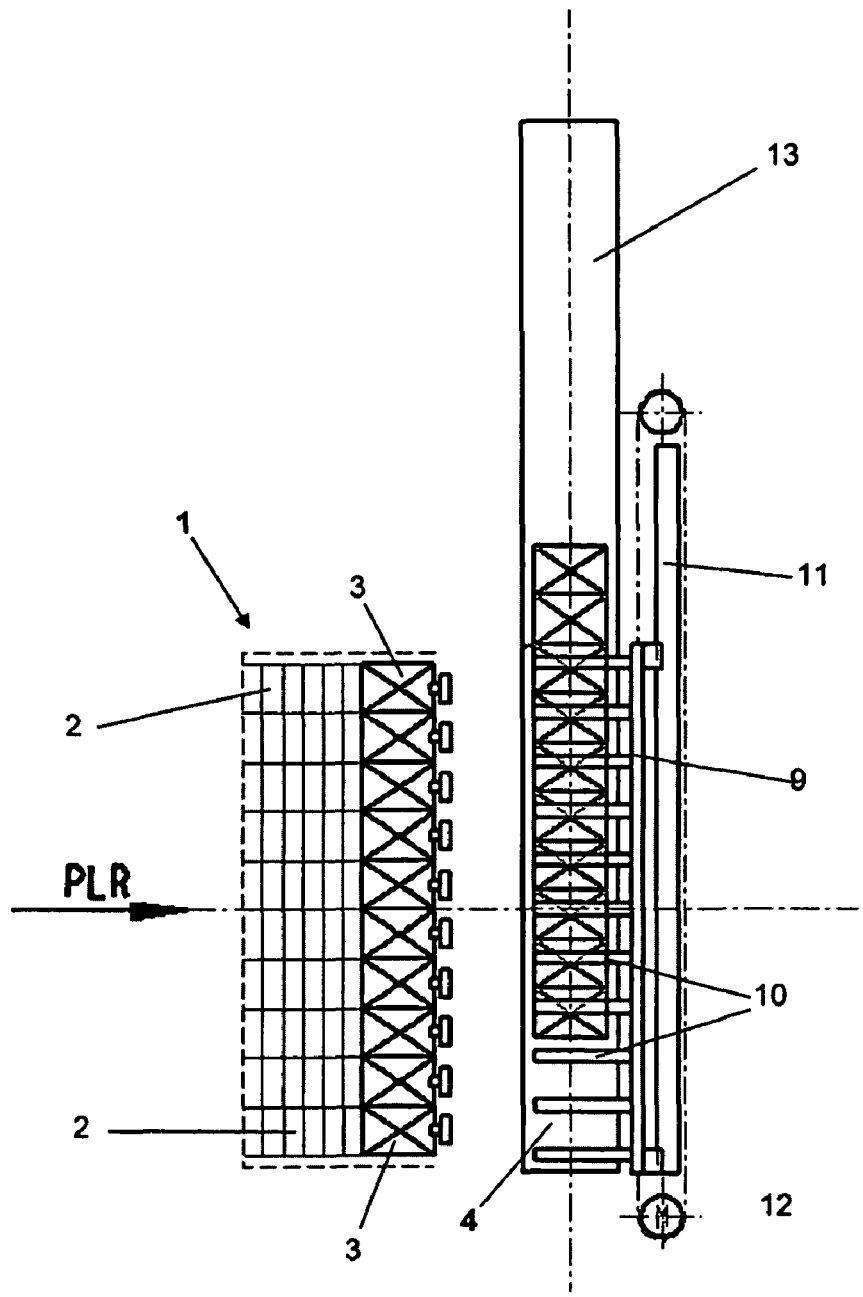
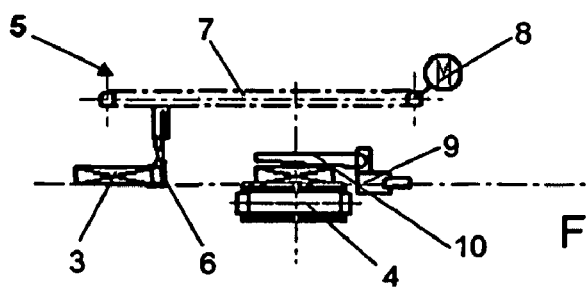
Fig. 5 a
Fig. 5 b

APPARATUS FOR COLLECTING AND CONVEYING STACKS OF SHEETS

CROSS REFERENCE TO RELATED APPLICATIONS

This application is the US national stage of PCT application PCT/EP2007/000719, filed 27 Jan. 2007, published 27 Dec. 2007 as WO2007/147452, and claiming the priority of German patent application 102006029342.8 itself filed 23 Jun. 2006, whose entire disclosures are herewith incorporated by reference.

FIELD OF THE INVENTION

The invention relates to a collecting and conveying apparatus for stacks of sheets and having a collecting station in which a corresponding number of stacks of sheets are created simultaneously from multiple overlapping streams of sheets delivered in parallel, comprising a cross conveyor provided a certain distance downstream of the collecting station for removing the finished sheet stacks transversely to the feed direction of the sheets to the collecting station, and comprising a transfer conveyor from which the sheet stacks are conveyed from the collecting station onto the cross conveyor.

A collecting and conveying apparatus having these features is described in DE 10 2004 056 018. The collecting and conveying apparatus is part of a paper-processing machine in which paper webs are cut to size by longitudinal and transverse trimming into sheets in a predefined format, and the resulting sheets are collected to create sheet stacks that are then packaged.

The sheets that are delivered continuously in multiple parallel rows and in overlapping form are collected in the collecting station until each stack has the desired number of sheets. The simultaneously created sheet stacks are conveyed by a transfer conveyor that has a number of movable tongs or bars matching the number of stacks created from the collecting station onto the cross conveyor. The cross conveyor, in the form of a conveyor belt, receives the series of parallel-created stacks and conveys them to downstream packaging apparatuses in which the stacks are packed.

The sheets are delivered to the collecting station in a number of overlapping streams depending on setup and without interruption. Once the specified number of sheets in the given stack has been reached, a separating finger moves into the overlapping stream and interrupts this stream such that the subsequent overlapping stream is pre-collected on the respective separating fingers until the finished stack is removed and the collecting station is once again free. As a result, the receiving zone of the cross conveyor must be again freed up by the quick removal of the stacks before the next series of stacks can be brought in by the transfer conveyor.

In the case of the known cross conveyors, the sheet stacks can be removed transversely at only relatively low acceleration from the region of the collecting station. When the sheets are collected to create stacks, air remains between the individual layers. As a result, the stacks are not very stable. If the acceleration is too great, individual sheets slide, thereby degrading the shape of the stack, or even making the entire stack unusable and thus interfering with production.

Since the air remaining between the layers in the sheet stacks also creates problems in terms of stack shape and packaging quality during the subsequent processes as well, a known approach is to provide air-removal stations in or downstream of the collecting station. EP 0 751 086 [U.S. Pat. No. 5,687,644] describes an air-removal station downstream of the collecting station; EP 1 568 639 describes an embodiment in which an air-removal station is installed on the separating finger of the collecting station. Another approach is known for preventing the above-described disadvantages whereby the stacks are charged electrostatically during transfer to the cross conveyor or during removal by the cross conveyor.

The known solutions provide only a limited increase in the cycle rate in the collecting and conveying apparatus. The effectiveness of electrostatic charges is highly dependent on the material and the environment, and thus not sufficiently reliable.

OBJECT OF THE INVENTION

The fundamental problem to be solved by this invention is therefore to improve a collecting and conveying apparatus of the generic kind in order to enable it to remove the sheet stacks from the region of the collecting station at a high cycle rate and without disturbing or degrading the stack quality of the stacks of sheets.

SUMMARY OF THE INVENTION

This problem is solved by an approach where adjacent the cross conveyor a carriage is provided that is synchronously movable with the cross conveyor over a certain path, to which carriage a series of holddown clamps are attached that are lowerable onto the stacks on the cross conveyor.

The holddown clamps enable the stacks to be pressed down onto the cross conveyor at least at the start of the transverse conveyance. The cross conveyor can thus be accelerated during the removal process at significantly higher rates. The holddown clamps are thus active at least during the acceleration phase of the cross conveyor. To this end, they are attached to a movable carriage that is accelerated synchronously with the cross conveyor. The cycle rate of the collecting and conveying apparatus can be increased significantly since the sheet stacks are accelerated on the cross conveyor while securely clamped.

The invention has the added advantage that air is pressed out from between the sheets when the holddown clamps are applied to the stacks. The holddown clamps can thus be advantageously designed to cover a large area and can thus be applied to the stacks with sufficient force from above such that during removal in the acceleration phase the sheet stacks are securely held down on the cross conveyor, while at the same time air is reliably pressed out of the sheet stacks. The pressing times for pressing out the air can be extended while maintaining the cycle rate since pressing can be done during conveyance of the stacks.

A further advantage is contributed in so far as the solution according to the invention is also usable with embodiments having a "double discharge." With double discharge, the cross conveyor is composed of at least two individual conveyors that can remove the stacks transversely in both directions. An embodiment of this type is described in DE 10 2004 056 018. In the case of a "double discharge," a synchronously accelaratable carriage with holddown clamp attached thereon is associated with each of the two opposing transversely-removing individual conveyors.

A further advantage consists in the fact that time is gained due to the very high initial acceleration whereby the stacks are then subsequently slowed down to the subsequent required conveyance speed. This deceleration is effected outside the region of the collecting station and outside the region of motion for the holddown clamps, which, as a result, are not applied to the stacks during the deceleration. Since the selected deceleration can be quite a bit lower, there is no danger that the sheets will slide within the stack, thereby causing breakdowns or degradation of stack quality.

The transfer conveyor preferably contains one or two grab carriages, such as those described in DE 10 2004 056 018. The holddown clamps, like the tongs of the grab carriages, extend in the direction in which the sheets are conveyed into the collecting station. This direction is called the workpiece travel direction travel direction (PLR).

BRIEF DESCRIPTION OF THE DRAWING

In the following the invention is described in more detail with reference to two embodiments.

FIGS. 1 through 6 illustrate a "single" design in which a cross conveyor removes the stacks transversely only in one direction.

DETAILED DESCRIPTION

Figure 1:
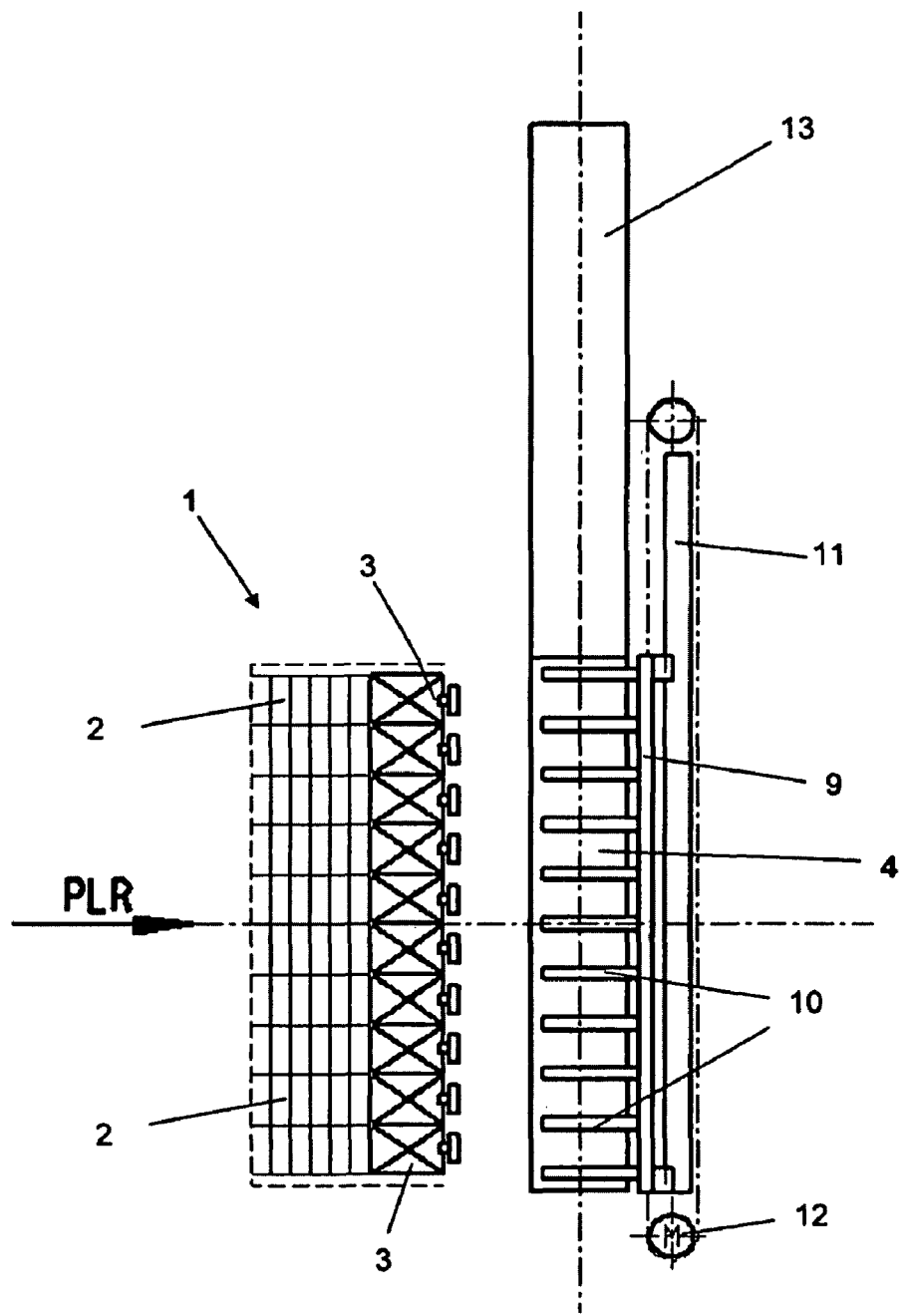
Figure 1:
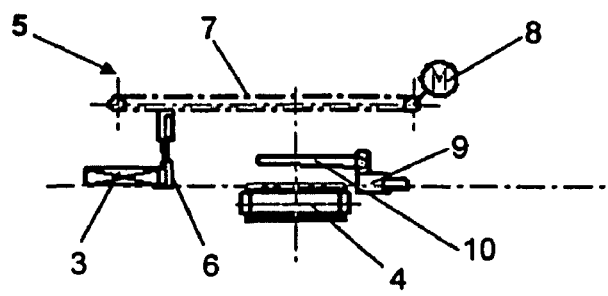
Figure 2:
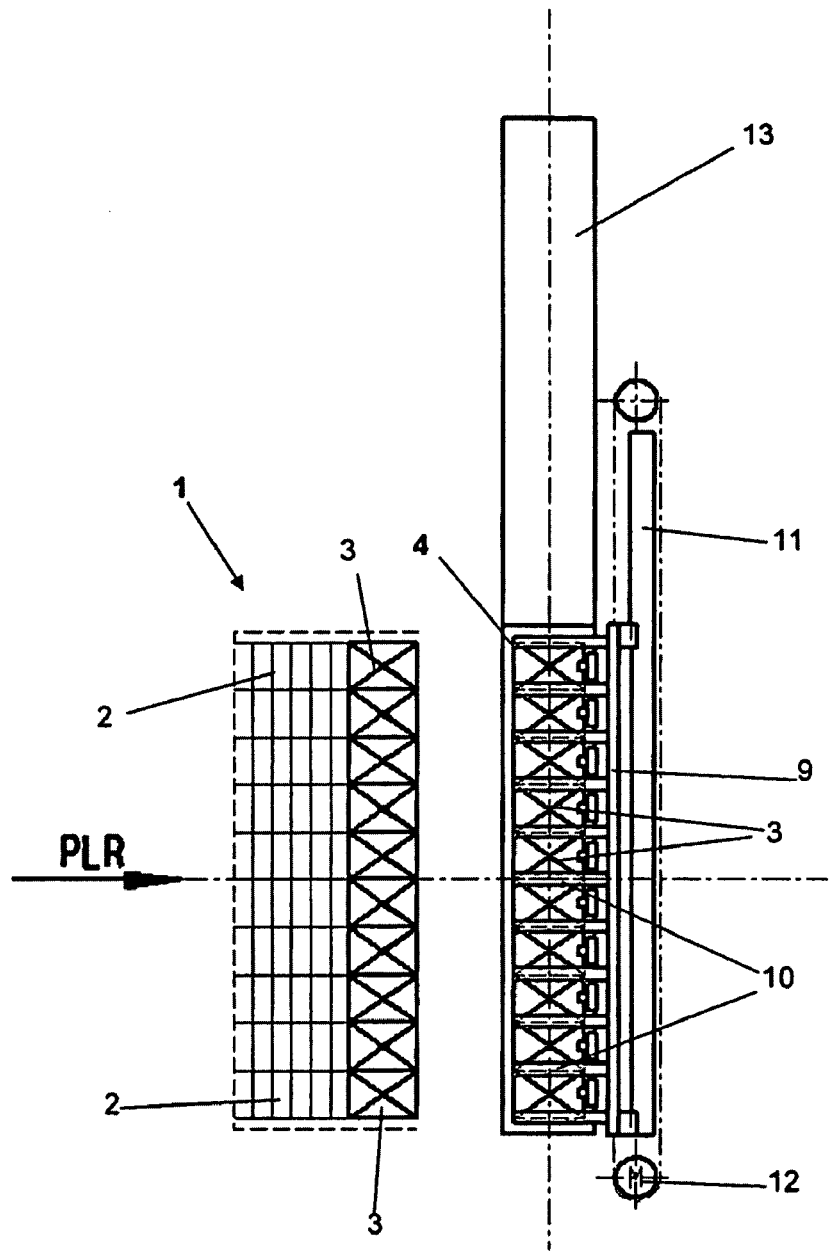
Figure 2:
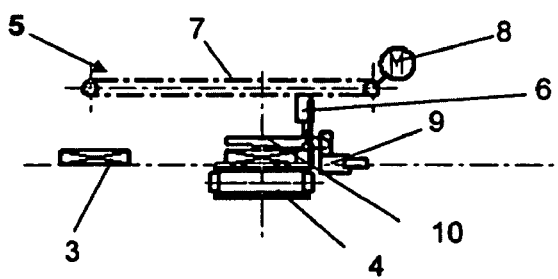

All of the embodiments of a collecting and conveying apparatus as shown in the figures are part of a paper-processing machine in which paper webs are cut longitudinally and transversely to size to a predefined format, and the resulting sheets are collected to create sheet stacks that are subsequently packaged. The collecting and conveying apparatus has a collecting station 1 to which the sheets are fed in a workpiece travel direction PLR in overlapping and parallel streams 2 without interruption. Here ten sheet stacks 3 are created from ten overlapping streams 2. A cross conveyor 4 is provided a predetermined distance downstream of the collecting station 1, from which the finished sheet stacks 3 are removed transversely to the workpiece travel direction PLR to an unillustrated packaging station. The cross conveyor 4 is preferably a conveyor belt that in the embodiment of FIGS. 1 through 6 in the form of a "single design" removes stacks 3 in only one direction (upward as shown in FIG. 1a). A transfer conveyor 5, which is shown more clearly in the side view of FIG. 1b, conveys finished sheet stacks 3 from the collecting station 1 onto the cross conveyor 4. The transfer conveyor 5 contains a grab carriage 6 having a number of tongs corresponding to the number of sheet stacks 3 formed adjacent to each other, the carriage being attached to an endless belt 7 that extends from collecting station 3 to beyond the cross conveyor 4. The belt 7 is driven by an electric motor 8, thereby enabling the grab carriage 6 carried thereon to be moved from the collecting station 3 to beyond the cross conveyor 4 and back again. A collecting and conveying apparatus of this type is described in DE 10 2004 056 018.

According to the invention, a carriage 9 is provided in the region of the collecting station 3 next to the cross conveyor 4, which carriage is synchronously movable together with this conveyor over a predefined path, and to which a series of holddown clamps 10 is attached that are lowerable onto the stacks 3 on the cross conveyor 4 so as to secure these stacks onto the cross conveyor 4 at least at the start of the transverse conveyance. The carriage 9 is movable over a certain path on a guide rail 11 extending parallel next to the cross conveyor 4 by means of a drive mechanism 12 from its starting position shown in FIG. 1a. The drive mechanism 12, preferably an electric servomotor, of the carriage 10 enables the carriage 9 to be accelerated synchronously with the cross conveyor 4. The carriage 9 is preferably provided together with the holddown clamps 10 in the workpiece travel direction downstream of the cross conveyor 4. The holddown clamps 10 are spaced apart and are attached so as to be upwardly and downwardly pivotal extending opposite the workpiece travel direction. The holddown clamps 10 are preferably offset over the length of the carriage 9 relative to the tongs of the grab carriage 6. In the starting position for the carriage 9, the tongs can thus be moved without obstruction between the holddown clamps 10. In order to ensure that each stack 3 can be secured by the holddown clamps 10, the length of the carriage 9 corresponds to the width of the collecting station 1, and a sufficient number of the holddown clamps 10 is provided over the length of the carriage 9. Preferably, the holddown clamps 10 are attached in an adjustable manner to the carriage 9 so as to be able to adjust their position to various stack formats. An accumulating conveyor 13 immediately follows the cross conveyor 4 and is aligned with this conveyor, the stacks 3 being delivered from the accumulating conveyor to a following packaging station.

The operational sequence for the removal of stacks 3 is illustrated in FIGS. 1 through 6.

Figure 3:
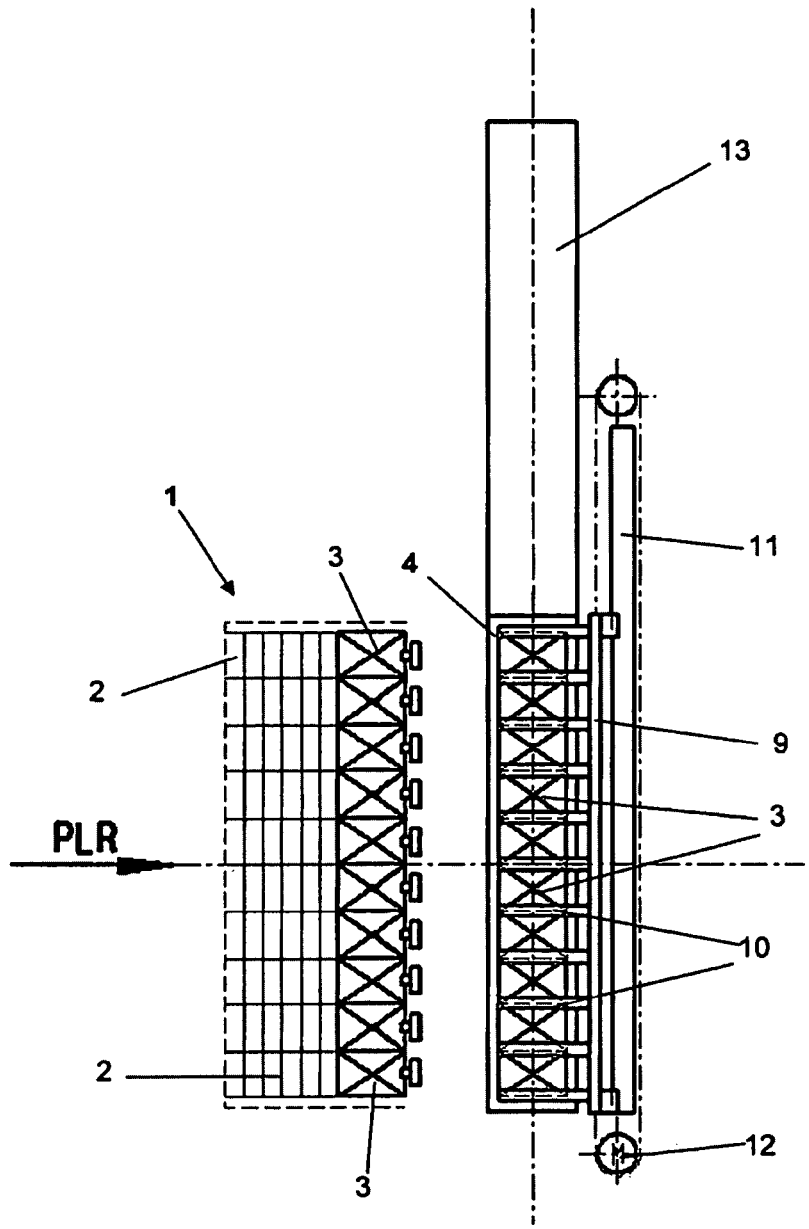
Figure 3:
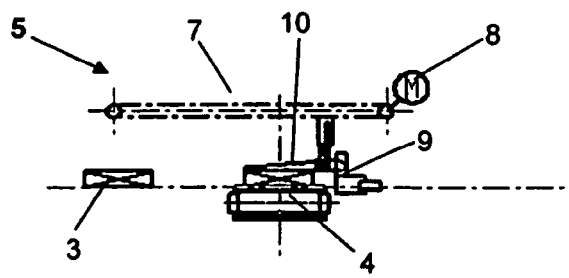
Figure 4:
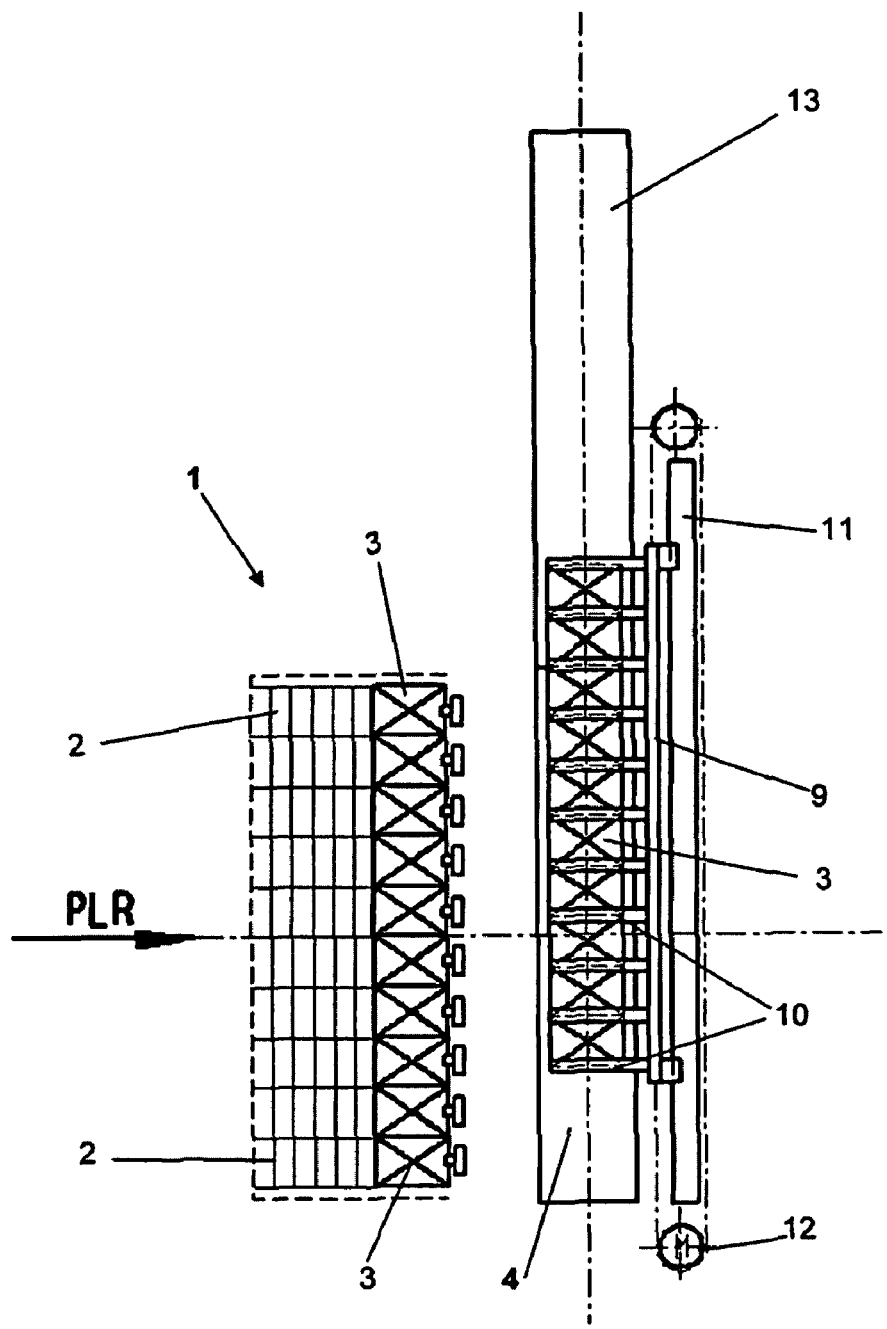
Figure 4:
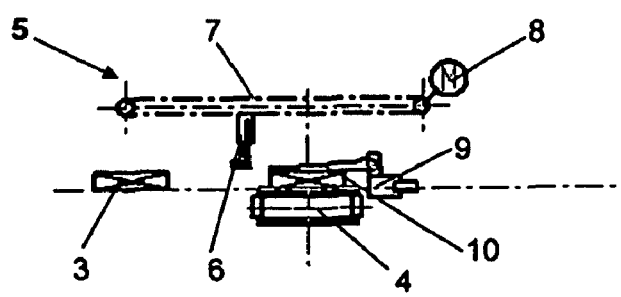
Figure 6:
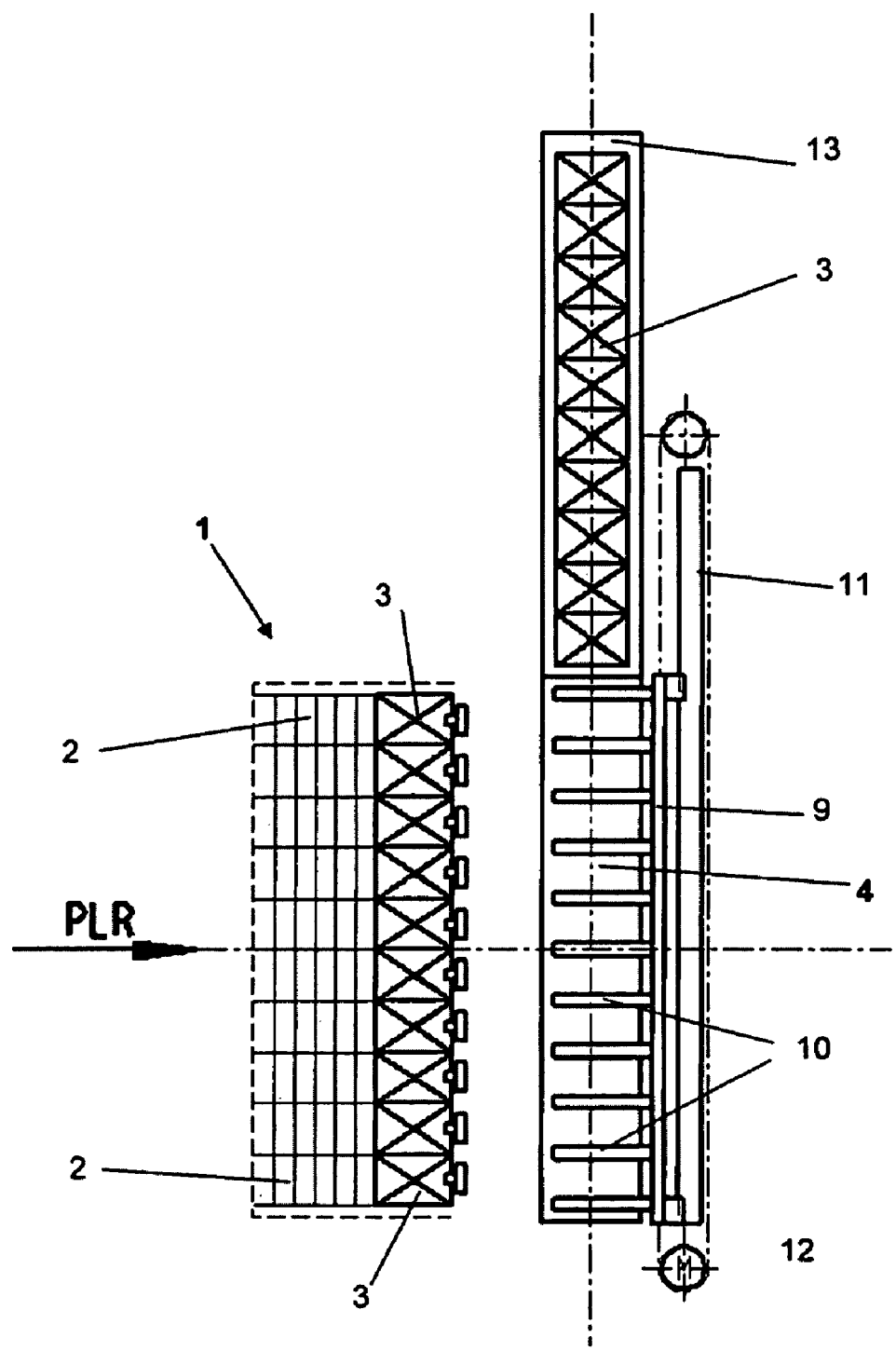

FIGS. 1a and b illustrate the starting position. The just finished stacks 3 are received by the grab carriage 6. The carriage 9 together with the holddown clamps 10 are in the starting position in which the holddown clamps 10 are aligned with the edges of the stacks 3 and are pivoted up. The finished stacks 3 are then conveyed by the grab carriage 6 onto the cross conveyor 4. New stacks 3 are already being created in the collecting station 1. The tongs of the grab carriage 6 are then released, and the holddown clamps 10 are lowered onto the tops of the stacks. Meanwhile, the stacks 3 are secured on the cross conveyor 4. At the same time, air is pressed out of the stacks 3 (FIG. 3). After the grab carriage 6 has moved back again into its stand-by position in front of the collecting station 1 (FIG. 4b), the cross conveyor 4 is accelerated synchronously with the accumulating conveyor 13 and the carriage 9, and simultaneously the holddown clamps 10 hold the stacks 3 securely on the conveyors 4 and 13.

As soon as the stacks 3 have been accelerated to the maximum, the holddown clamps 10 again lift away, and the holddown clamp carriage 9 returns to its starting position (FIG. 5). The grab carriage 6 is outside the path of the holddown clamp carriage 9 during the outward and return travel of the carriage 9 (FIGS. 4b, 5b). All the stacks 3 are then on the accumulating conveyor 13. The carriage 9 together with the pivoted-up holddown clamps 10 is at its starting position in which the cross conveyor 4 can again be loaded with new stacks 3 from the grab carriage 6.

A "double discharge" is illustrated in FIGS. 7 through 10, the cross conveyor 4 of this system removing stacks 3 in both directions transverse to the workpiece travel direction so as to accelerate removal.

Figure 7:
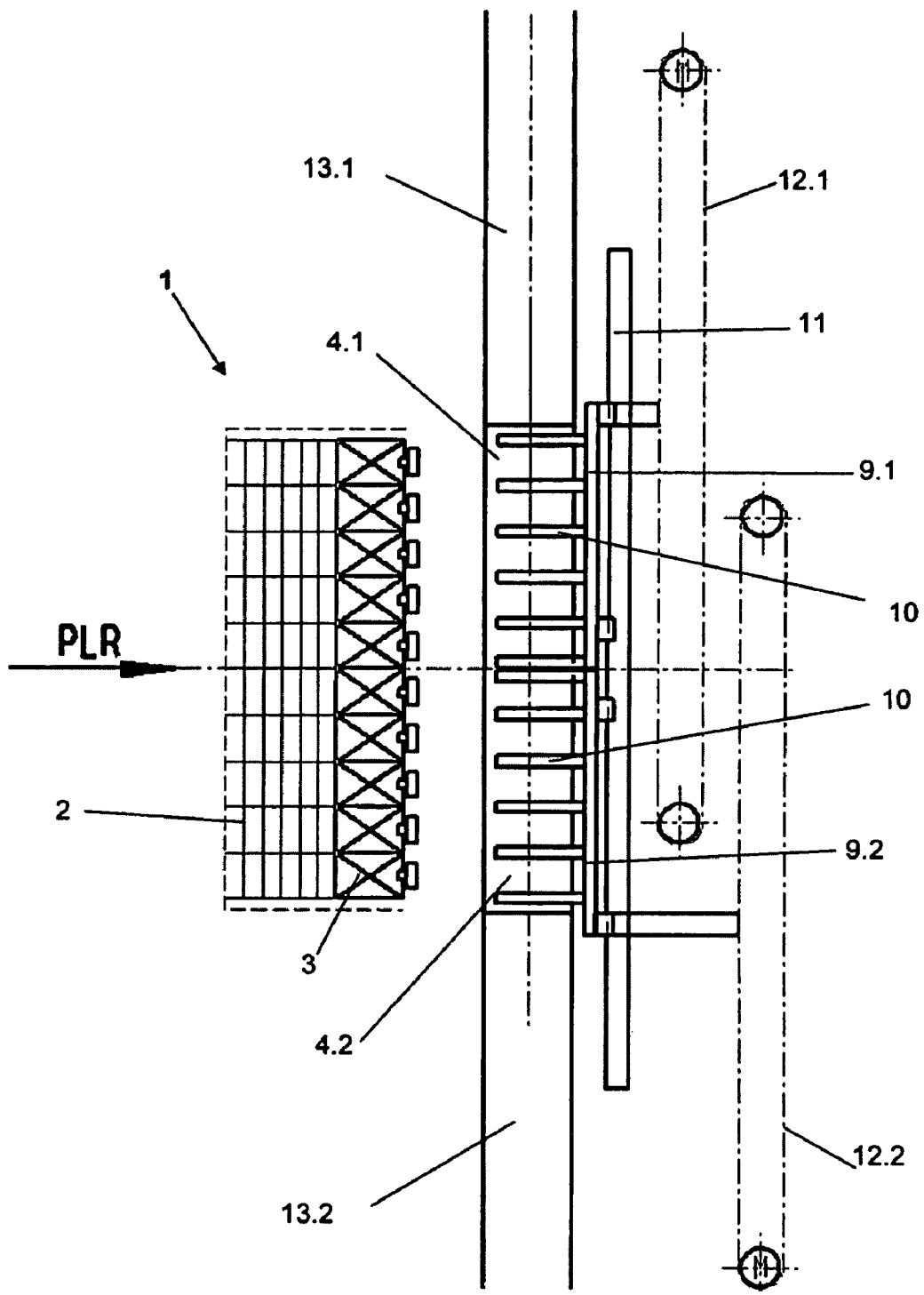
FIGS. 7 through 10 illustrate a "double discharge" design in which a cross conveyor composed of at least two individual conveyors removes stacks in both directions transverse to the workpiece travel direction.
Figure 8:
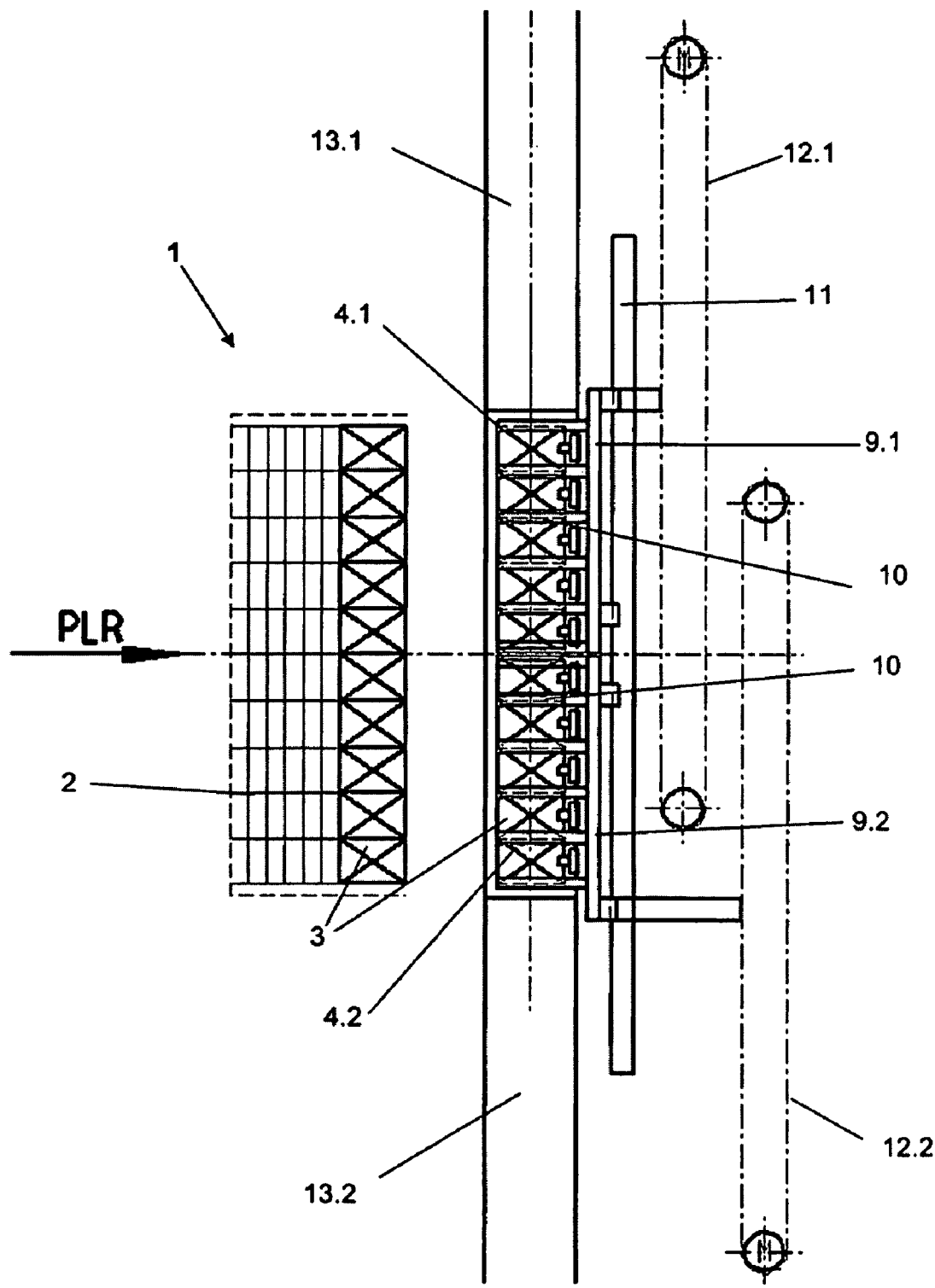
Figure 9:
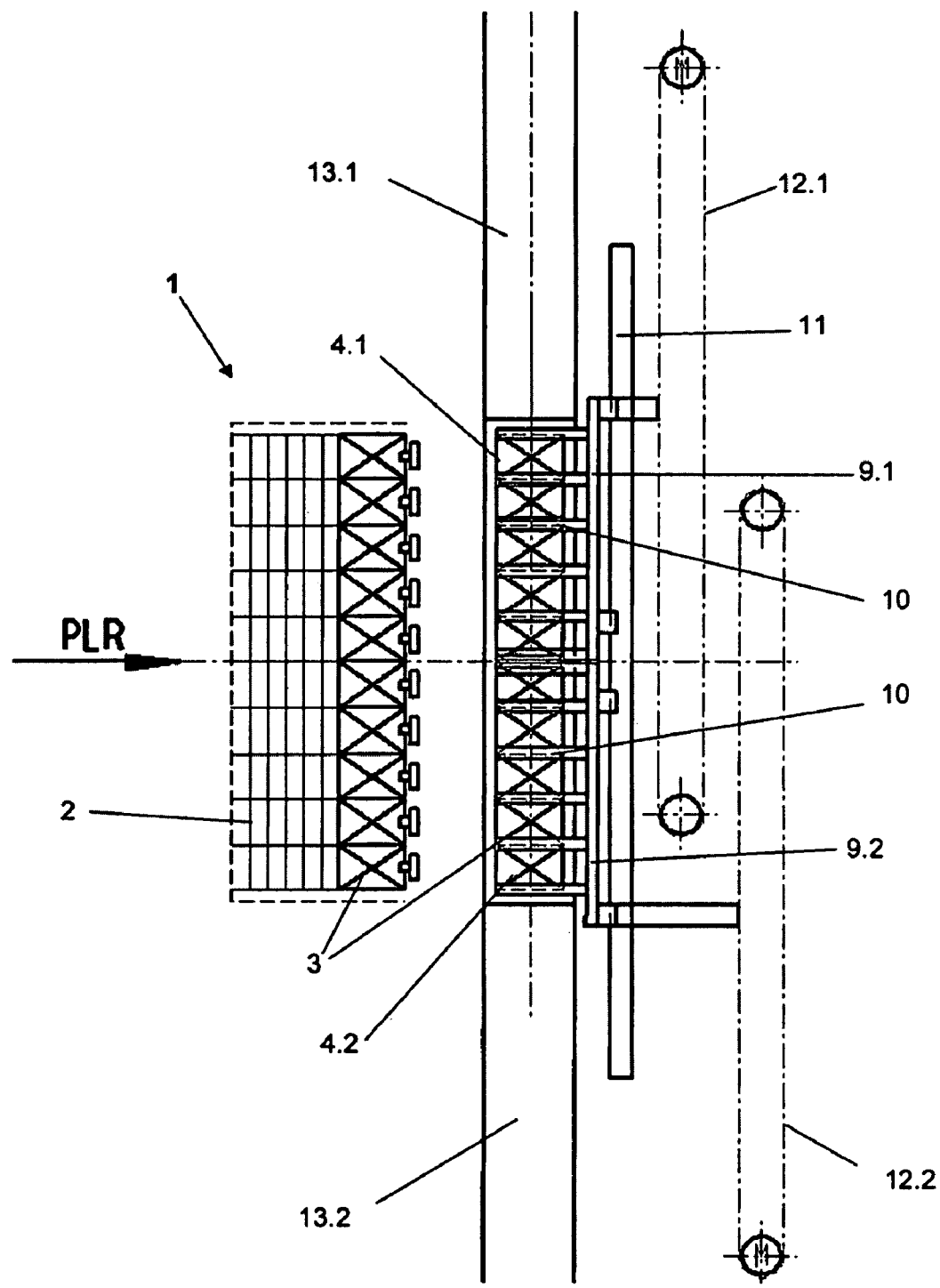

The cross conveyor 4, is composed of two single conveyors 4.1 and 4.2, of which one conveyor 4.1 removes stacks 3 to the left (at the top in FIG. 7), while the other single conveyor 4.2 removes the stacks to the right (at the bottom in FIG. 7). Both conveyors 4.1 and 4.2 are aligned with each other such that each extends up to the center of the machine. Each conveyor 4.1 and 4.2 thus receives half the stacks created in collecting station 1; five each in the illustrated embodiment.

Alternatively, it is possible to arrange the single conveyors back-to-back in tandem, one portion of the stacks being delivered to each conveyor. This type of embodiment is described in DE 10 2004 056 018.

In order to ensure that stacks 3 removed onto each single conveyor 4.1 and 4.2 can be secured during the acceleration phase, two carriages 9.1 and 9.2 with holddown clamps 10 are provided downstream of the conveyors 4.1 and 4.2. Each carriage 9.1 and 9.2 has its own drive mechanism 12.1, 12.2 that enables the carriage with its associated cross conveyor 4.1 and 4.2 to be moved outward synchronously from the machine center. Both carriages 9.1 and 9.2 are movably mounted on a guide rail 11 that extends parallel to the cross conveyors 4.1, 4.2. The collecting and conveying apparatus of FIGS. 7 through 10 is otherwise designed analogously to the embodiment of FIGS. 1 through 6. Analogous components are therefore identified using matching reference numbers.

FIG. 7 illustrates the starting position in which stacks 3 have just been completed. The holddown clamps 10 that are pivotally mounted on carriages 9.1 and 9.2 are pivoted up, thereby enabling finished stacks 3 to be conveyed by a grab carriage, not shown, onto the cross conveyors 4.1 and 4.2. Since the boundary between the two conveyors 4.1 and 4.2 runs through the center of the machine, in each case half of the stacks 3 is placed on one of the two conveyors 4.1 and 4.2. The carriages 9.1 and 9.2 are positioned such that they abut each other at the center of the machine.

Figure 10:
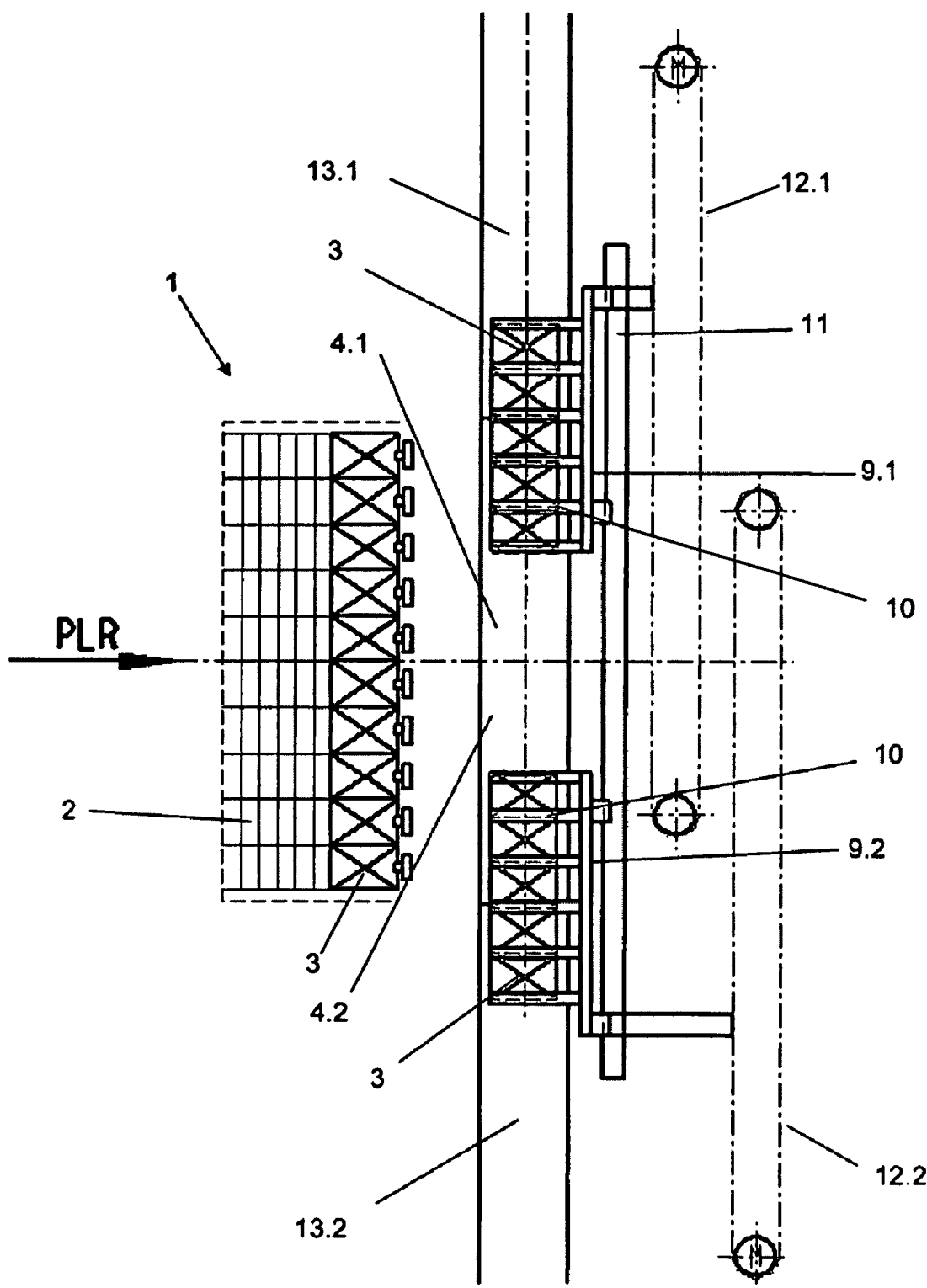

After the grab carriage has moved the stacks onto the cross conveyors 4.1 and 4.2 (FIG. 8), the holddown clamps 10 are pivoted down onto the stacks 3 so as to secure them and press out the air. At the same time, the grab carriage is moved to its stand-by position in front of the collecting station 1 in which it is situated outside the travel path of the carriages 9.1 and 9.2 so as to avoid collisions with these carriages. The stacks 3 are then synchronously removed in both directions from the cross conveyors 4.1 and 4.2 onto the accumulating conveyors 13 (FIG. 10). The respective carriages 9.1 and 9.2 are accelerated synchronously with the cross conveyors 4.1 and 4.2 so that stacks 3 are held securely by the respective holddown clamps 10.

The invention claimed is:

1. A collecting and conveying apparatus for paper sheets, the apparatus comprising:
    means for feeding a plurality of rows of sheets in a longitudinal travel direction to a transversely extending collecting station for forming in the collecting station at a downstream end of each row of sheets a respective stack of the respective sheets;
    a transversely extending cross conveyor adjacent the collecting station and displaceable transversely of the longitudinal travel direction;
    a carriage shiftable transversely synchronously with the cross conveyor and carrying respective holddown clamps aligned in an upstream position in the longitudinal travel direction with the rows and engageable downwardly with the stacks on the cross conveyor; and
    means for pressing the holddown clamps down against the respective stacks on the cross conveyor during displacement of the stacks on the cross conveyor away from the collecting station while pressing the stacks down against the cross conveyor at least during an acceleration phase of the cross conveyor.

2. The collecting and conveying apparatus according to claim 1 wherein the carriage is movable together with the holddown clamps by an electric servomotor.

3. The collecting and conveying apparatus according to claim 1, wherein the cross conveyor is composed of at least two single conveyors that remove the stacks in opposite directions, and that a respective carriage is associated with each single conveyor, each carriage being synchronously movable together with the respective single conveyor.

4. The collecting and conveying apparatus defined in claim 1 wherein the holddown clamps are each of sufficiently large area to press air out of the respective stacks.

* * * * *